United States Patent
Gu et al.

(10) Patent No.: US 12,481,407 B2
(45) Date of Patent: Nov. 25, 2025

(54) FOLDABLE DISPLAY DEVICE COMPRISING HOLES AND ENGRAVED PATTERNS BETWEEN THE HOLES IN A FOLDING REGION

(71) Applicant: Samsung Display Co., LTD., Yongin-si (KR)

(72) Inventors: Dasom Gu, Yongin-si (KR); Hirotsugu Kishimoto, Yongin-si (KR); Chul Ho Jeong, Yongin-si (KR); Sungguk An, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/387,814

(22) Filed: Nov. 7, 2023

(65) Prior Publication Data
US 2024/0160328 A1 May 16, 2024

(30) Foreign Application Priority Data
Nov. 11, 2022 (KR) .................. 10-2022-0150907

(51) Int. Cl.
*G06F 3/044* (2006.01)
*H04M 1/02* (2006.01)

(52) U.S. Cl.
CPC ........ *G06F 3/0448* (2019.05); *H04M 1/0216* (2013.01); *G06F 3/0445* (2019.05); *G06F 3/0446* (2019.05); *G06F 2203/04102* (2013.01); *G06F 2203/04107* (2013.01)

(58) Field of Classification Search
CPC .... G06F 3/0448; G06F 3/0445; G06F 3/0446; G06F 2203/04102; G06F 2203/04107; H04M 1/0216
See application file for complete search history.

(56) References Cited

U.S. PATENT DOCUMENTS

| | | | |
|---|---|---|---|
| 11,455,006 B2 | 9/2022 | Hong et al. | |
| 2020/0225708 A1* | 7/2020 | Wu | G06V 40/1306 |
| 2020/0266368 A1* | 8/2020 | Park | H10K 50/87 |
| 2021/0305350 A1* | 9/2021 | Rieutort-Louis | H10K 59/131 |
| 2021/0333944 A1* | 10/2021 | Jung | H10K 77/111 |
| 2023/0049246 A1* | 2/2023 | Wang | H10K 77/111 |

FOREIGN PATENT DOCUMENTS

| | | |
|---|---|---|
| KR | 101647023 B1 | 8/2016 |
| KR | 102170258 B1 | 10/2020 |
| KR | 1020220039920 A | 3/2022 |
| KR | 20220098581 A * | 7/2022 |

OTHER PUBLICATIONS

Lin et al., Attributes, Fabrication, and Applications of Gallium-Based Liquid Metal Particles, Advanced Science, p. 1-18 (Year: 2020).*
Liang et al.,Laser Engraved Liquid Metal Circuit for Wearable Electronics, Jan. 30, 2022, Bioengineering 2022, 9, 59. https://doi.org/10.3390/bioengineering9020059, pp. 1-11 (Year: 2022).*
Ko et al. KR20220098581 English translation (Year: 2022).*

* cited by examiner

*Primary Examiner* — Benjamin C Lee
*Assistant Examiner* — Nathan P Brittingham
(74) *Attorney, Agent, or Firm* — CANTOR COLBURN LLP

(57) ABSTRACT

An electronic apparatus includes a display module and a digitizer, the digitizer includes a plurality of engraved patterns in a folding part of a base layer thereof, and liquid metal may be disposed in the plurality of engraved patterns.

19 Claims, 14 Drawing Sheets

FOLDABLE DISPLAY DEVICE COMPRISING HOLES AND ENGRAVED PATTERNS BETWEEN THE HOLES IN A FOLDING REGION

This application claims priority to Korean Patent Application No. 10-2022-0150907, filed on Nov. 11, 2022, and all the benefits accruing therefrom under 35 U.S.C. § 119, the content of which in its entirety is herein incorporated by reference.

BACKGROUND

The present disclosure herein relates to an electronic apparatus, and more particularly, to an electronic apparatus including a digitizer.

Importance of an electronic apparatus has increased as a visual information delivery media in an information society. The electronic apparatus is activated by receiving an electric signal. The electronic apparatus includes a digitizer that senses an input applied from the outside of a display layer for displaying an image.

The digitizer of the electronic apparatus may include various sensing coils so as to be activated by an electric signal. An area in which the sensing coils are activated reacts to a signal applied from the outside.

SUMMARY

The present disclosure provides an electronic apparatus in which a digitizer for sensing an external input has improved folding characteristics.

An embodiment of the present invention provides an electronic apparatus including: a display module having a first non-folding area and a second non-folding area, which are arranged in a first direction, and a folding area disposed between the first non-folding area and the second non-folding area and foldable with respect to a virtual folding axis extending in a second direction crossing the first direction; and a digitizer disposed below the display module. Here, the digitizer includes: a base layer having a first non-folding part overlapping with the first non-folding area, a second non-folding part overlapping with the second non-folding area, and a folding part which overlaps the folding area and in which a plurality of holes are defined in a plan view; a plurality of first coils disposed on a first surface of the base layer and having a first portion overlapping with the first non-folding part, and extending in the first direction, a second portion overlapping with the second non-folding part and extending in the first direction, and a third portion which overlaps the folding part and surrounds corresponding holes of the plurality of holes in the plan view; and a plurality of second coils disposed on a second surface of the base layer, which is opposite to the first surface. Also, the base layer has a plurality of engraved patterns defined in the folding part, and the third portion includes liquid metal and is disposed in the engraved patterns.

In an embodiment, the liquid metal may include at least one of a gallium alloy, Eutectic gallium-indium (EGain), or galinstan.

In an embodiment, each of the first portion and the second portion may include copper.

In an embodiment, the plurality of engraved patterns may include a plurality of first patterns and a plurality of second patterns, each of which surrounds a portion of corresponding holes among the plurality of holes.

In an embodiment, the plurality of engraved patterns may further include: a third pattern, of the plurality of first patterns, configured to connect two first patterns adjacent to each other in the first direction; and a fourth pattern configured to connect two second patterns, of the plurality of second patterns, adjacent to each other in the first direction.

In an embodiment, each of the first patterns may include a first-first pattern and a first-second pattern, which each extend in the second direction and are spaced apart from each other in the first direction with one hole therebetween among the plurality of holes, and a first-third pattern configured to connect the first-first pattern and the first-second pattern, and each of the second patterns may include a second-first pattern and a second-second pattern, which each extend in a direction opposite to the second direction and are spaced apart from each other in the first direction with one hole therebetween among the plurality of holes, and a second-third pattern configured to connect the second-first pattern and the second-second pattern.

In an embodiment, in the plan view, the plurality of engraved patterns may include two engraved patterns which each extend in the first direction and are spaced apart from each other in the second direction with one hole therebetween among the plurality of holes, and a spaced distance between the two engraved patterns may be greater than about 5.5 millimeters (mm) and less than about 7.5 mm.

In an embodiment, in the plan view, the plurality of engraved patterns may include two engraved patterns which each extend in the second direction and are spaced apart from each other in the first direction with one hole therebetween among the plurality of holes, and a spaced distance between the two engraved patterns may be greater than about 0.1 mm and less than about 0.6 mm.

In an embodiment, in the plan view, the plurality of engraved patterns may include two engraved patterns that each extend in the first direction and are spaced apart from each other in the second direction between holes adjacent to each other in the second direction among the plurality of holes. In this case, a spaced distance between the two engraved patterns except for widths of the two engraved patterns may be greater than about 0.01 mm, and a spaced distance between the two engraved patterns including widths of the two engraved patterns may be less than about 0.2 mm.

In an embodiment, each of the engraved patterns may have a width of about 0.01 mm or more and about 0.09 mm or less.

In an embodiment, the plurality of holes may include a first group hole and a second group hole, which each extend in the second direction and are spaced apart from each other in the first direction, and the second group hole may be disposed shifted by a predetermined distance from the first group hole in the second direction.

In an embodiment, the base layer may include a matrix having a filler and fiber lines disposed in the matrix and having a weave shape.

In an embodiment, the matrix may include at least one of epoxy, polyester, polyamides, polycarbonates, polypropylene, polybutylene, and vinyl ester, and the filler may include at least one of silica, barium sulphate, sintered talc, barium titanate, titanium oxide, clay, alumina, mica, boehmite, zinc borate, and zinc titanate.

In an embodiment, the third portion may have a top surface disposed at a higher position than the one surface of the base layer in a thickness direction thereof.

In an embodiment of the present invention, an electronic apparatus includes: a display module having a first non-folding area and a second non-folding area, which are arranged in a first direction, and a folding area disposed between the first non-folding area and the second non-folding area and foldable with respect to a virtual folding axis extending in a second direction crossing the first direction; a panel protection layer disposed below the display module; and a digitizer including a base layer having a folding part which overlaps the folding area and in which a plurality of holes are defined and a first non-folding part and a second non-folding part spaced apart from each other in the first direction with the folding part therebetween in a plan view, and the digitizer further includes sensing coils disposed on the base layer and disposed below the panel protection layer. Here, the base layer has a plurality of engraved patterns defined in the folding part, and at least a portion of the sensing coil disposed on the folding part is disposed in the engraved patterns.

BRIEF DESCRIPTION OF THE FIGURES

The accompanying drawings are included to provide a further understanding of the present invention, and are incorporated in and constitute a part of this specification. The drawings illustrate embodiments of the present invention and, together with the description, serve to explain principles of the present invention. In the drawings.

DETAILED DESCRIPTION

Figure 1A:
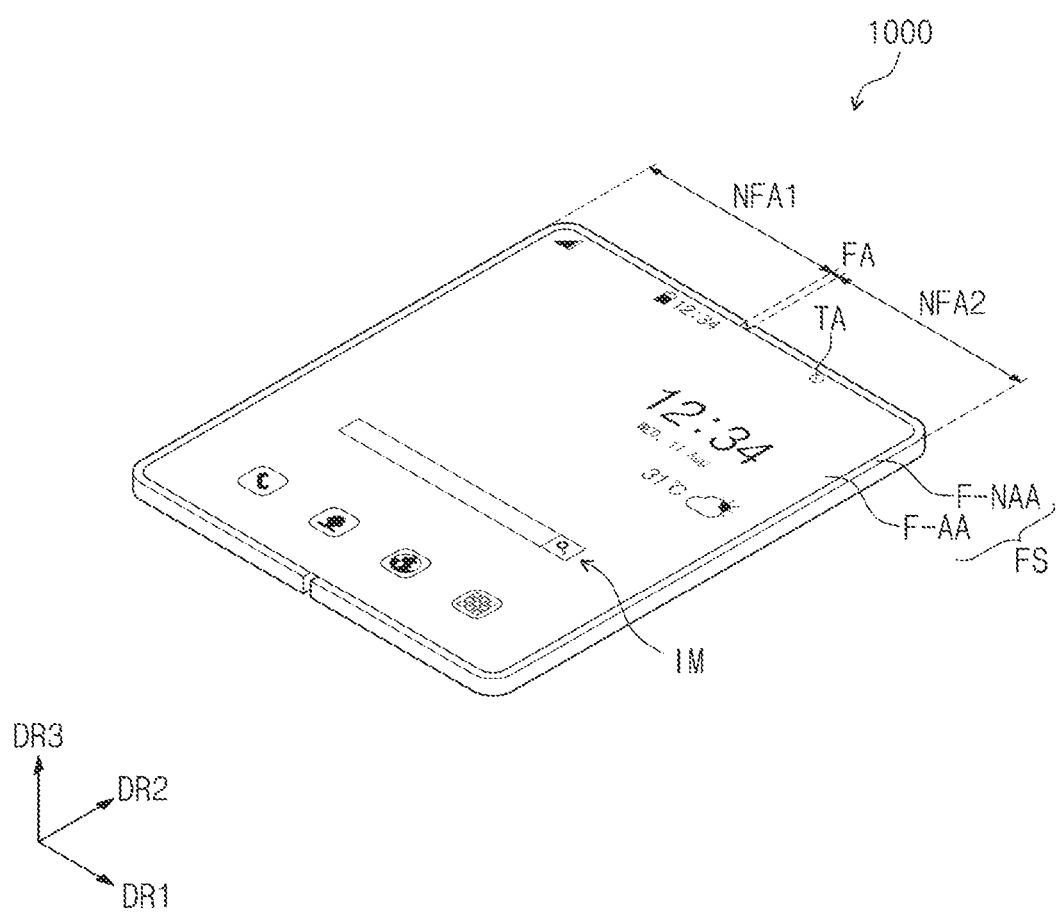
FIG. 1A is a perspective view illustrating an unfolded state of a display apparatus according to an embodiment of the present invention.

In this specification, it will be understood that when one component (or region, layer, portion) is referred to as being 'on', 'connected to', or 'coupled to' another component, it can be directly disposed/connected/coupled on/to the one component, or an intervening third component may also be present.

Like reference numerals refer to like elements throughout. Also, in the figures, the thickness, ratio, and dimensions of components are exaggerated for clarity of illustration. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

It will be understood that although the terms such as 'first' and 'second' are used herein to describe various elements, these elements should not be limited by these terms. The terms are only used to distinguish one component from other components. For example, a first element referred to as a first element in one embodiment can be referred to as a second element in another embodiment without departing from the scope of the appended claims. The terms of a singular form may include plural forms unless referred to the contrary.

Also, spatially relative terms, such as "below", "lower", "above", and "upper", may be used herein for ease of description to describe an element and/or a feature's relationship to another element(s) and/or feature(s) as illustrated in the drawings. The terms may be a relative concept and described based on directions expressed in the drawings.

The meaning of 'include' or 'comprise' specifies a property, a fixed number, a step, an operation, an element, a component or a combination thereof, but does not exclude other properties, fixed numbers, steps, operations, elements, components or combinations thereof.

Unless otherwise defined, all terms (including technical and scientific terms) used herein have the same meaning as generally understood by those skilled in the art. Terms as defined in a commonly used dictionary should be construed as having the same meaning as in an associated technical context, and unless defined apparently in the description, the terms are not ideally or excessively construed as having formal meaning.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value. Hereinafter, embodiments of the present invention will be described with reference to the accompanying drawings.

Figure 1B:
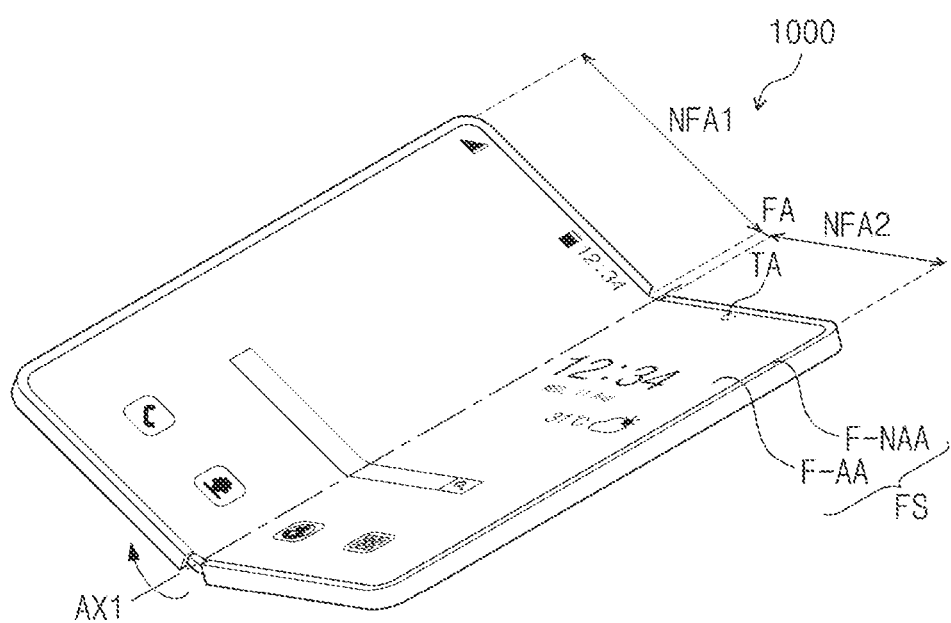
FIG. 1B is a perspective view illustrating a folding operation state of the electronic apparatus according to an embodiment of the present invention.
Figure 1B:
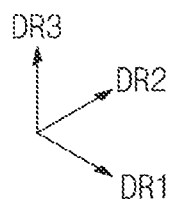
Figure 1C:
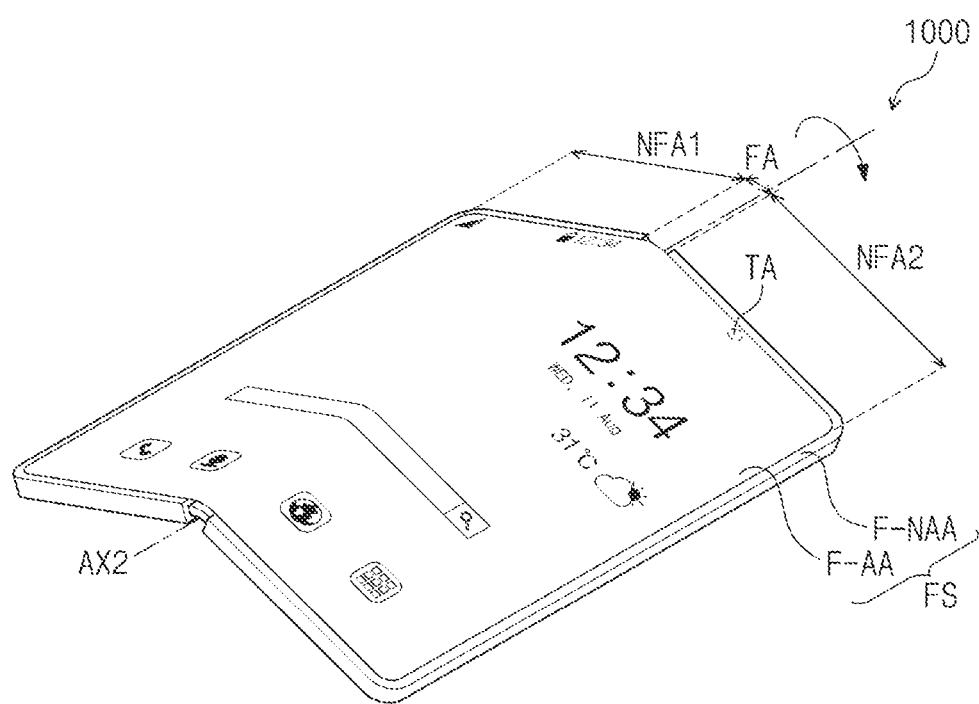
FIG. 1C is a perspective view illustrating another folding operation state of the electronic apparatus according to an embodiment of the present invention.
Figure 1C:
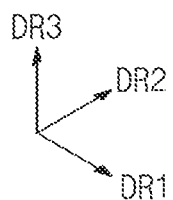
Figure 1D:
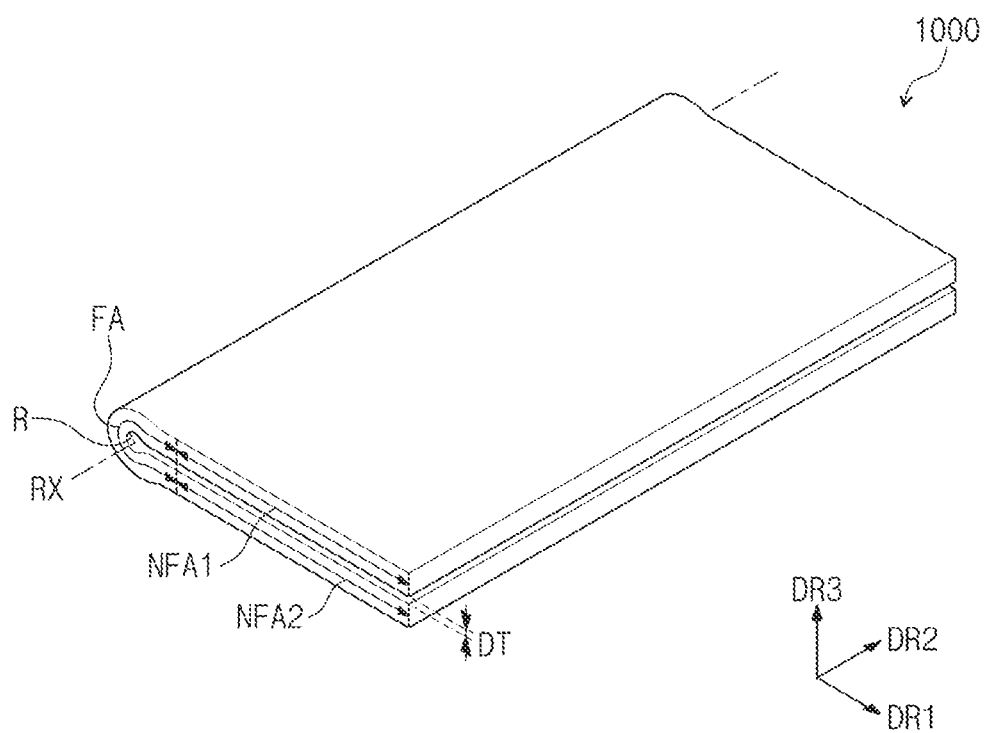
FIG. 1D is a perspective view illustrating a folded state of the electronic apparatus according to an embodiment of the present invention.
Figure 1E:
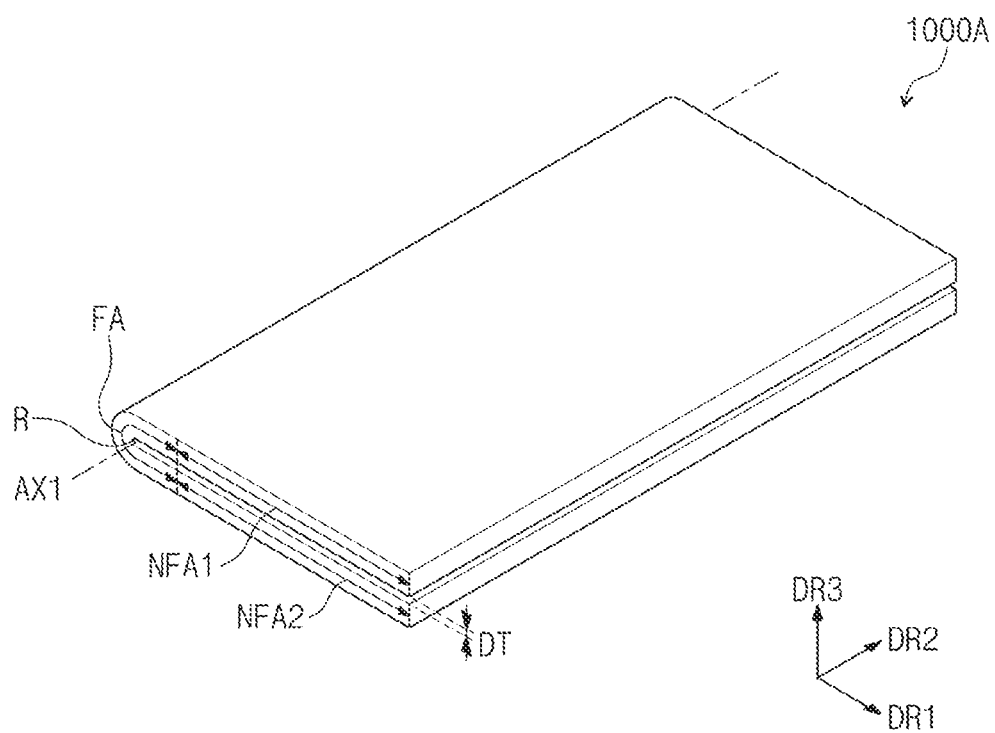
FIG. 1E is a perspective view illustrating a folded state of the electronic apparatus according to an embodiment of the present invention.

FIG. 1A is a perspective view illustrating an unfolded state of an electronic apparatus according to an embodiment of the present invention. FIG. 1B is a perspective view illustrating a folding operation state of the electronic apparatus according to an embodiment of the present invention. FIG. 1C is a perspective view illustrating a folding operation state of the electronic apparatus according to an embodiment of the present invention. FIG. 1D is a perspective view illustrating a folded state of the electronic apparatus according to an embodiment of the present invention. FIG. 1E is a perspective view illustrating a folded state of an electronic apparatus according to an embodiment of the present invention.

Referring to FIGS. 1A to 1E, an electronic apparatus 1000 according to an embodiment of the present invention may be activated by an electrical signal. The electronic apparatus 1000 may include various embodiments. For example, the electronic apparatus 1000 may include tablet computers, notebook computers, personal computers, smart televisions, etc. In this embodiment, a smartphone is illustrated as an example of the electronic apparatus 1000.

The electronic apparatus 1000 may display an image IM toward a third direction DR3 on a display surface FS in parallel to each of a first direction DR1 and a second direction DR2. The display surface FS on which the image IM is displayed may correspond to a front surface of the electronic apparatus 1000. The image IM may include a static image as well as a dynamic image. As an example of the image IM, an internet search window, a clock window, and a plurality of applications are illustrated in FIGS. 1A to 1C.

According to this embodiment, a front surface (or a top surface) and a rear surface (or a bottom surface) of each of members are defined based on a direction in which the image IM is displayed. The front surface and the rear surface may be opposing to each other in the third direction DR3, and a normal direction of each of the front surface and the rear surface may be parallel to the third direction DR3.

A spaced distance between the front surface and the rear surface in the third direction DR3 may correspond to a thickness or height of the electronic apparatus 1000 in the third direction DR3. Here, directions indicated by the first to third directions DR1, DR2 and DR3, as relative concepts, may be converted with respect to each other.

The electronic apparatus 1000 may sense an external input applied from the outside. The external input may be an input of a user. The input of the user may include various types of inputs such as a portion of a user's body, an electromagnetic pen, light, heat, or pressure. When the electronic apparatus 1000 senses an input of the electromagnetic pen, the electronic apparatus 1000 may further include a digitizer driven by a method using electromagnetic resonance ("EMR") caused by electromagnetic induction. However, the embodiment of the present invention is not limited thereto.

The display surface FS of the electronic apparatus 1000 may include an active area F-AA and a peripheral area F-NAA. The active area F-AA may be activated by an electrical signal. The active area F-AA may be an area on which the image IM is displayed and which senses an external input.

The peripheral area F-NAA may be disposed adjacent to the active area F-AA. The peripheral area F-NAA may have a predetermined color with an optical transmittance less than an optical transmittance of the active area F-AA. The peripheral area F-NAA may surround the active area F-AA. Thus, the active area F-AA may substantially have a shape defined by the peripheral area F-NAA. However, this is merely illustrative. For example, the peripheral area F-NAA may be disposed adjacent to only one side of the active area F-AA or omitted.

The display surface FS may further include a signal transmission area TA. Although the signal transmission area TA is contained in the active area F-AA as an example in FIGS. 1A to 1C, the embodiment of the present invention is not limited thereto. For another example, the signal transmission area TA may be contained in the peripheral area F-NAA or surrounded by each of the active area F-AA and the peripheral area F-NAA.

The signal transmission area TA may have an optical transmittance greater than an optical transmittance of each of the active area F-AA and the peripheral area F-NAA. Natural light, visible light, or infrared light may move through the signal transmission area TA.

The electronic apparatus 1000 may further include a sensor that photographs an external image through visible light passing through the signal transmission area TA or determines accessibility of an external object through infrared light. The sensor may overlap the signal transmission area TA. Thus, the electronic apparatus 1000 including a sensor with improved reliability may be provided.

Referring to FIG. 1B, the electronic apparatus 1000 according to an embodiment may be a foldable electronic apparatus 1000. For example, the electronic apparatus 1000 may be foldable along a first virtual folding axis AX1 extending in the second direction DR2. The first folding axis AX1 may be disposed on the display surface FS.

The electronic apparatus 1000 may include a folding area FA that is foldable along the first folding axis AS1 and a first non-folding area NFA1 and a second non-folding area NFA2, which are spaced apart from each other in the first direction DR1 with the folding area FA therebetween. The folding area FA may be referred to as a foldable area, and each of the first and second non-folding areas NFA1 and NFA2 may be referred to as a non-foldable area.

The electronic apparatus 1000 may be folded in an in-folding method by which the first non-folding area NFA1 and the second non-folding area NFA2 are folded with respect to the first folding axis AX1 to face each other. When the electronic apparatus 1000 is folded in the in-folding method, the display surface FS may not be exposed to the outside. In the embodiment of the present invention, a 'first mode' may be defined as the unfolded state of the electronic apparatus 1000, and a 'second mode' may be defined as the folded state of the electronic apparatus 1000.

Referring to FIG. 1C, the electronic apparatus 1000 may be folded in an out-folding method by which the first non-folding area NFA1 and the second non-folding area NFA2 are folded with respect to a second folding axis AX2 in opposing directions. The second folding axis AX2 may be disposed on a surface opposing to the display surface FS. When the electronic apparatus 1000 is folded in the out-folding method, the display surface FS may be seen to the user.

The electronic apparatus 1000 according to an embodiment may operate in one method selected from the in-folding method and the out-folding method with respect to folding axes extending in the same line. Alternatively, the electronic apparatus 1000 may repeat operations of the in-folding method and the out-folding method with respect to one folding axis.

Referring to FIG. 1D, when the electronic apparatus 1000 according to an embodiment is in-folded, at least a portion of the folding area FA may have a predetermined curvature. The folding area FA may have a center RX of curvature at an inside thereof, and the electronic apparatus 1000 may be folded with a predetermined radius R of curvature with respect to the center RX of curvature. According to an embodiment, the radius R of curvature may be greater than a distance DT between the first non-folding area NFA1 and the second non-folding area NFA2.

Referring to FIG. 1E, the electronic apparatus 1000A according to an embodiment may be folded with the predetermined radius R of curvature when in-folded. Here, a distance DT between a portion extending from the folding area FA to the first non-folding area NFA1 and a portion extending from the folding area FA to the second non-folding area NFA2 may be constant in the first direction DR1. However, the embodiment of the present invention is not limited thereto.

Figure 2:
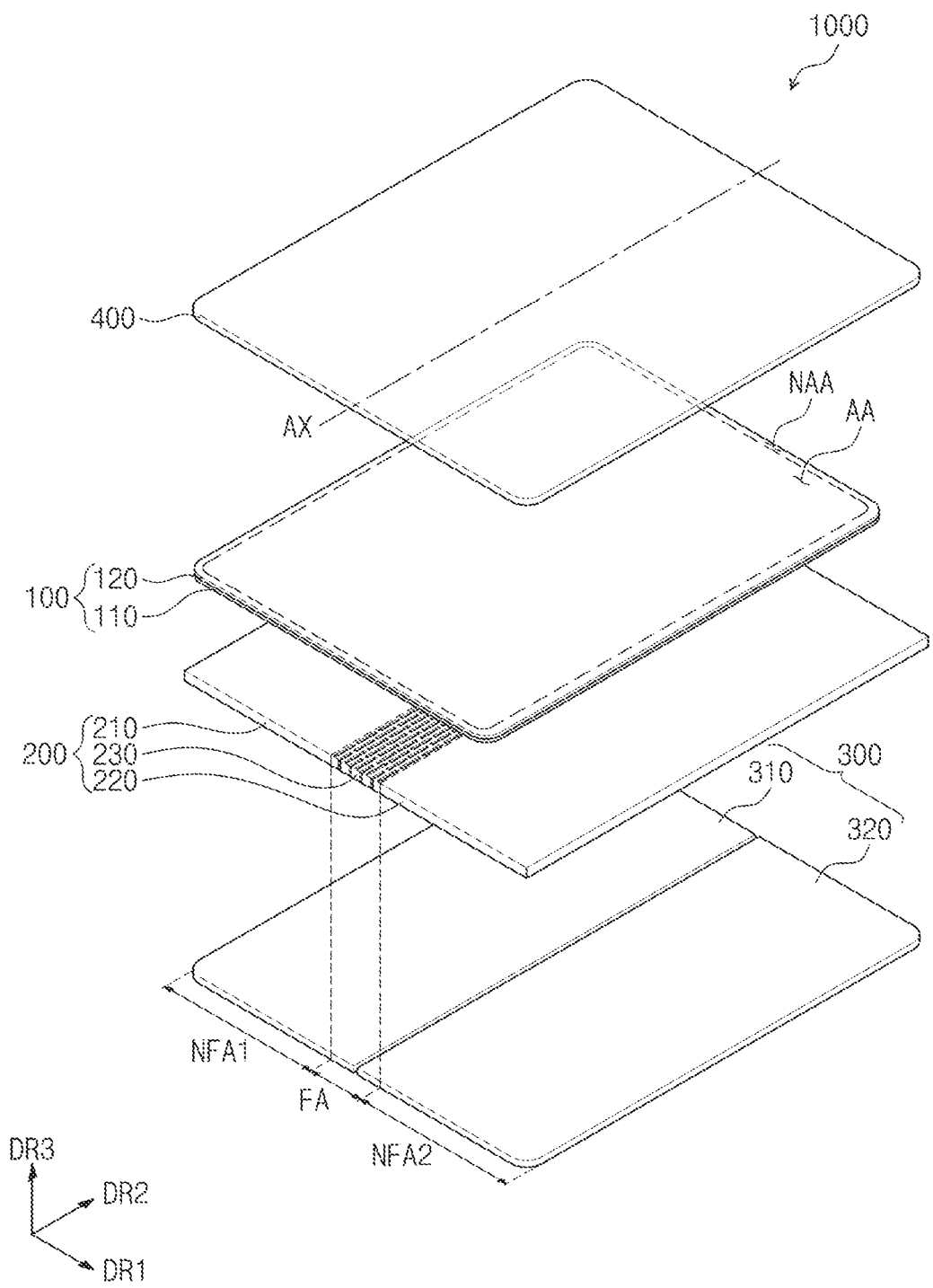
FIG. 2 is an exploded perspective view illustrating the electronic apparatus according to an embodiment of the present invention.
Figure 3:
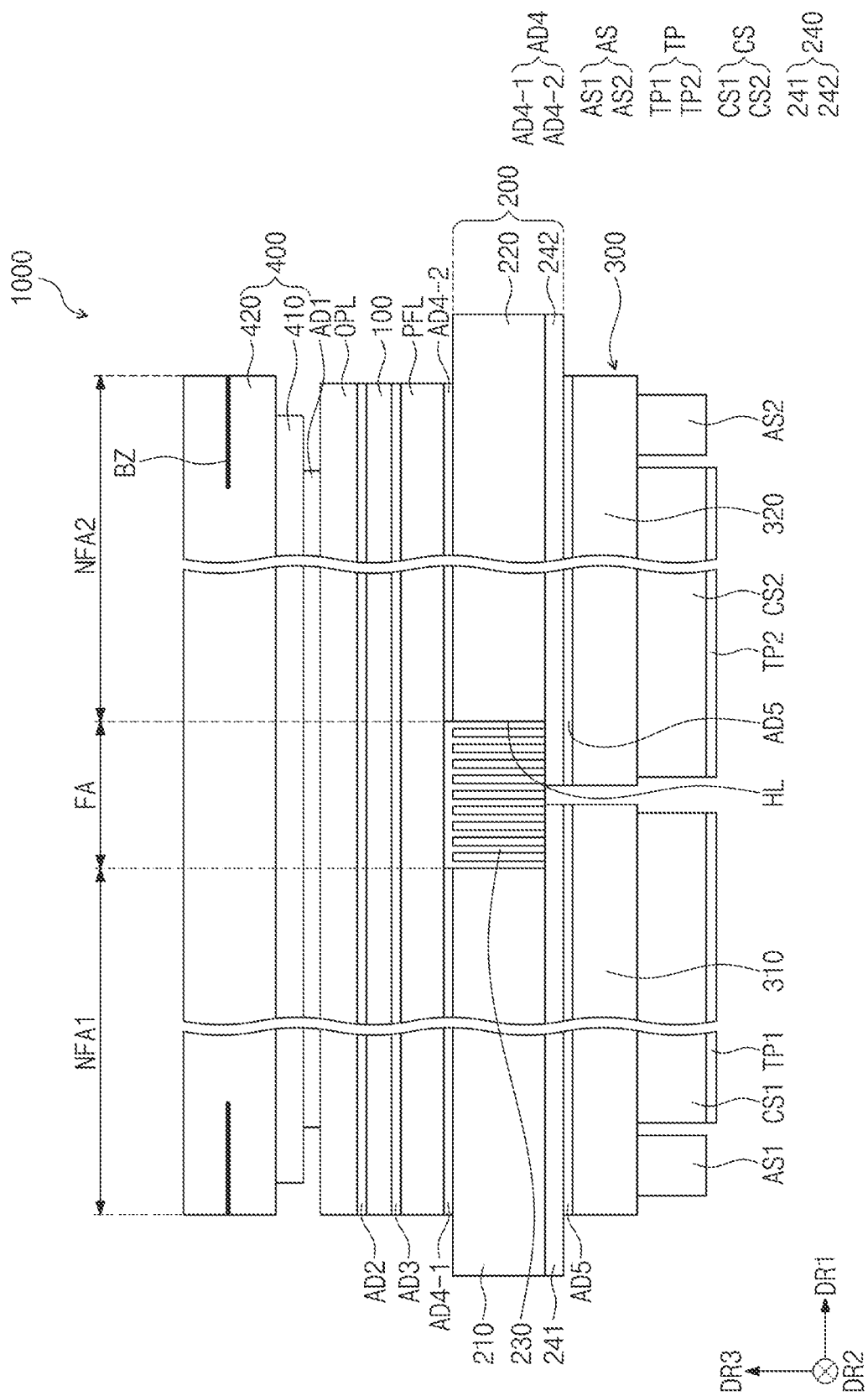
FIG. 3 is a cross-sectional view illustrating the electronic apparatus according to an embodiment of the present invention.

FIG. 2 is an exploded perspective view of the electronic apparatus according to an embodiment of the present invention. FIG. 3 is a cross-sectional view of the electronic apparatus according to an embodiment of the present invention. FIG. 2 illustrates only some components of components contained in the electronic apparatus 1000.

Referring to FIGS. 2 and 3, the electronic apparatus 1000 may include a display module 100, a digitizer 200, a cushion layer 300, and a window 400. In more detail, the electronic apparatus 1000 may include a plurality of adhesive layers AD1 to AD5, upper functional layers disposed between the display module 100 and the window 400, and lower functional layers disposed below the digitizer 200.

The adhesive layers AD1 to AD5 that will be described below may include one of an optical clear adhesive ("OCA"), an optical clear resin ("OCR"), and a pressure sensitive adhesive ("PSA").

The display module 100 may be flexible. The display module 100 may have an active area AA and a peripheral area NAA, which correspond to the active area F-AA and the peripheral area F-NAA of the electronic apparatus 1000 in FIG. 1A, respectively.

The display module 100 may include a display panel 110 displaying an image and an input sensor 120 sensing an external input. The display panel 110 may be a light emitting type display panel 110. However, the embodiment of the present invention is not particularly limited thereto. For example, the display panel 110 may be an organic light emitting display panel 110 or an inorganic light emitting display panel 110. The organic light emitting display panel 110 may include a light emitting element containing an organic light emitting material. The inorganic light emitting display panel 110 may include a light emitting element containing a quantum dot or a quantum rod. Also, the display panel 110 according to an embodiment may include a micro-LED element and/or a nano-LED element. However, the embodiment of the present invention is not limited thereto.

The display panel 110 may include a plurality of pixels each including any one of the above-described light emitting elements. Light emitting layers contained in the light emitting elements are disposed on the active area AA and emit predetermined colors, respectively. When a plurality of light emitting layers are provided, the light emitting elements may correspond to the light emitting layers, respectively. Alternatively, when one light emitting layer is provided, color filters or color conversion members disposed on the light emitting layer may be further provided.

The input sensor 120 may be disposed on the display panel 110. The input sensor 120 may be driven in a capacitive manner. The input sensor 120 may sense an applied position and/or strength of a hand of the user over the entire active area F-AA. The input sensor 120 may include sensing electrodes that are insulated from each other, routing lines that are connected to corresponding sensing electrodes, and at least one sensing insulation layer.

The input sensor 120 according to an embodiment may be provided on the display panel 110 through a continuous process. In this case, it may be expressed that the input sensor 120 is 'directly disposed' on the display panel 110.

For example, a feature of being "directly disposed" may represent that a third component is not disposed between the input sensor 120 and the display panel 110. That is, a separate adhesive member may not be disposed between the input sensor 120 and the display panel 110.

However, the embodiment of the present invention is not limited thereto. For another example, the input sensor 120 may be provided as a separate module and coupled with the display panel 110 through an adhesive layer.

The digitizer 200 may be disposed below the display module 100. The digitizer 200 according to an embodiment of the present invention may sense an input of the electromagnetic pen. Here, the digitizer 200 may be driven by a method of using electromagnetic resonance (EMR) caused by electromagnetic induction.

The digitizer 200 may be disposed below the display module 100 to support the display module 100. The digitizer 200 may include a first non-folding part 210, a second non-folding part 220, and a folding part 230. Also, the digitizer 200 may further include a shielding layer 240.

The first non-folding part 210 may overlap at least a portion of the first non-folding area NFA1. The second non-folding part 220 may overlap at least a portion of the second non-folding area NFA2. The folding part 230 may overlap the folding area FA. Thus, the folding part 230 may be disposed between the first non-folding part 210 and the second non-folding part 220.

A plurality of holes HL passing through the digitizer 200 in the third direction DR3 may be defined in the folding part 230 of the digitizer 200. For example, the plurality of holes HL may be defined in the folding part 230 while passing from a top surface to a rear surface of the digitizer 200. The plurality of holes HL may correspond to the folding area FA and be spaced apart from each other in the first direction DR1 and the second direction DR2.

The shielding layer 240 may include a first shielding layer 241 and a second shielding layer 242. The first shielding layer 241 may overlap a portion of the folding part 230 and the first non-folding part 210, and the second shielding layer 242 may overlap another portion of the folding part 230 and the second non-folding part 220. The first shielding layer 241 and the second shielding layer 242 may be spaced apart from each other along the first direction DR1 in the folding area FA. However, the embodiment of the present invention is not limited thereto. For another example, the shielding layer 240 may be disposed over the entire folding area FA to cover the holes HL.

In this embodiment, the shielding layer 240 may include metal. For example, the shielding layer 240 may include magnetic metal powder ("MMP"). However, the embodiment of the present invention is not limited to the material of the shielding layer 240. For example, the material of the shielding layer 240 may include one of permalloy that is an alloy of nickel (Ni) and iron (Fe), invar, and stainless steel.

When the electronic apparatus 1000 according to an embodiment of the present invention performs folding operations of repeating the first mode and the second mode, a shape of the display module 100 may be substantially deformed in correspondence to a shape of the digitizer 200.

A base layer on which sensing coils are to be disposed in the digitizer 200 according to an embodiment may include a reinforced fiber composite. The digitizer 200 may include a reinforced fiber disposed in a matrix part. The reinforced fiber may be a carbon fiber or a glass fiber. The matrix part may include a polymer resin. The matrix part may include a thermoplastic resin. The sensing coils may be disposed on a front surface and a rear surface of the base layer and insulated from each other.

That is, the digitizer 200 according to an embodiment of the present invention may simultaneously perform a function of a protection member and a function of a sensing member that senses the input of the electromagnetic pen. A description of the functions of the protection member and the sensing member will be described later.

The cushion layer 300 may be disposed below the digitizer 200. Alternatively, the cushion layer 300 may be disposed on the digitizer 200 unlike as illustrated in FIG. 3. The cushion layer 300 may protect the display module 100 from an impact transmitted from below the display module 100. The cushion layer 300 may include a foam or a sponge. The foam may include a polyurethane foam or a thermoplastic polyurethane foam. When the cushion layer 300 includes the foam, a barrier film may be added to the cushion layer 300 as a base layer, and a foaming agent may be foamed on the barrier film to provide the cushion layer 300.

The cushion layer 300 may include a first cushion layer 310 and a second cushion layer 320. The first cushion layer 310 may overlap a portion of the folding part 230 and the first non-folding part 210. The second cushion layer 320 may overlap another portion of the folding part 230 and the second non-folding part 220. The first cushion layer 310 and the second cushion layer 320 may be spaced apart from each other along the first direction DR1 in the folding area FA.

The first cushion layer 310 and the second cushion layer 320 may prevent foreign substances from being introduced to the holes HL defined in the folding part 230 when the electronic apparatus 1000 is in the first mode. Although the folding part 230 is folded with a predetermined curvature when the electronic apparatus 1000 is in the second mode, the shape of the digitizer 200 may be easily deformed because the first cushion layer 310 and the second cushion layer 320 are spaced apart from each other in an area overlapping the folding part 230.

The window 400 may be disposed on the display module 100. The window 400 may be coupled with a housing (not shown) to define an appearance and protect the display module 100. The window 400 may be made of an optically transparent material so that light provided from the display module 100 is transmitted therethrough. The window 400 provides the display surface FS (refer to FIG. 1A) of the electronic apparatus 1000.

The window 400 may include a first layer 410, a second layer 420, and a bezel pattern BZ. The first layer 410 may include glass.

The second layer 420 is disposed on the first layer 410. The second layer 420 may include a material having a lower modulus relative to the first layer 410. For example, the second layer 420 may be a film containing an organic material. The second layer 420 may have a greater thickness relative to the first layer 410. Thus, the second layer 420 may protect a top surface of the first layer 410.

The second layer 420 may include at least one functional layer. The functional layer may include at least one of a window protection layer, an anti-fingerprint layer, and an anti-reflection layer.

The window 400 may transmit the image from the display module 100 and simultaneously relieve an external impact to prevent the display module 100 from being damaged or malfunctioned by the external impact.

The window 400 according to an embodiment may include a thin-film glass or a synthetic resin film. When the window 400 includes the thin-film glass, the window 400 may have a thickness of about 100 micrometers (μm) or less. For example, although the window 400 may have a thickness of about 30 μm, the embodiment of the present invention is not limited thereto.

When the window 400 includes the synthetic resin film, the window 400 may include a polyimide ("PI") film or a polyethylene terephthalate ("PET") film.

The window 400 may have a multi-layer structure or a single-layer structure. For example, the window 400 may include a plurality of synthetic resin films coupled by an adhesive or a glass substrate and a synthetic resin film coupled by an adhesive.

The window 400 may be made of a flexible material. Thus, the window 400 may be folded or unfolded with respect to the folding axis AX. That is, a shape of the window 400 may be deformed in correspondence to the digitizer 200 according to operations of the first mode and the second mode.

An optical layer OPL may be disposed between the display module 100 and the window 400. The optical layer OPL may be coupled with the window 400 through a first adhesive layer AD1. Also, the optical layer OPL may be coupled with the display module 100 through a second adhesive layer AD2.

The optical layer OPL may have various functions. The optical layer OPL may include a flexible synthetic resin film. For example, the optical layer OPL may be produced by dyeing an iodine compound onto a polyvinyl alcohol ("PVA") film. Alternatively, the optical layer OPL may include a color filter. Although the optical layer OPL may include various layers as long as the layers may reduce the reflectance of external light, the embodiment of the present invention is not limited thereto.

A panel protection layer PFL may be disposed between the display module 100 and the digitizer 200. The panel protection layer PFL and the display module 100 may be coupled by a third adhesive layer AD3. The panel protection layer PFL may be disposed below the display module 100 to protect a lower portion of the display module 100. The panel protection layer PFL may include a flexible plastic material. For example, the panel protection layer PFL may include polyethylene terephthalate. In this specification, the panel protection layer PFL may be referred to as a protection layer and indicated by the same reference numeral.

The digitizer 200 and the panel protection layer PFL may be coupled by a fourth adhesive layer AD4. The fourth adhesive layer AD4 may include a fourth-one adhesive layer AD4-1 and a fourth-two adhesive layer AD4-2. The fourth-one adhesive layer AD4-1 and a fourth-two adhesive layer AD4-2 may be spaced apart from each other with the folding area FA therebetween.

The fourth-one adhesive layer AD4-1 may be disposed between the digitizer 200 and the panel protection layer PFL in correspondence to the first non-folding area NFA1, and the fourth-two adhesive layer AD4-2 may be disposed between the digitizer 200 and the panel protection layer PFL in correspondence to the second non-folding area NFA2. Thus, the fourth-one adhesive layer AD4-1 may couple the first non-folding part 210 with a portion of the panel protection layer PFL, and the fourth-two adhesive layer AD4-2 may couple the second non-folding part 220 with another portion of the panel protection layer PFL.

The electronic apparatus 1000 may further include a metal plate CS, an insulation layer TP, and a step compensation member AS, which are disposed below the cushion layer 300. The metal plate CS may absorb an external impact to protect the display module 100. The metal plate CS may include stainless steel. The metal plate CS may include a first metal layer CS1 and a second metal layer CS2. first shielding layer 241 may be coupled with the first cushion layer 310 by a portion of a fifth adhesive layer AD5, and the second metal layer first shielding layer 241 CS2 may be coupled with the second cushion layer 320 by another portion of the fifth adhesive layer AD5.

The insulation layer TP may be disposed below the metal plate CS. The insulation layer TP may prevent static electricity from being introduced to the metal plate CS. The insulation layer TP may be an insulation film. The insulation layer TP may include a first insulation layer TP1 and a second insulation layer TP2, which are coupled to the first metal layer CS1 and the second metal layer CS2, respectively.

The step compensation member AS is coupled to a lower side of the cushion layer 300. The step compensation member AS may be a double sided tape or an insulation film The step compensation member AS may include a first step compensation member AS1 and a second step compensation member AS2, which are coupled to the first cushion layer 310 and the second cushion layer 320, respectively.

The electronic apparatus 1000 according to an embodiment may not include at least one of the metal plate CS, the insulation layer TP, and the step compensation member AS. However, the embodiment of the present invention is not limited thereto.

Figure 4A:
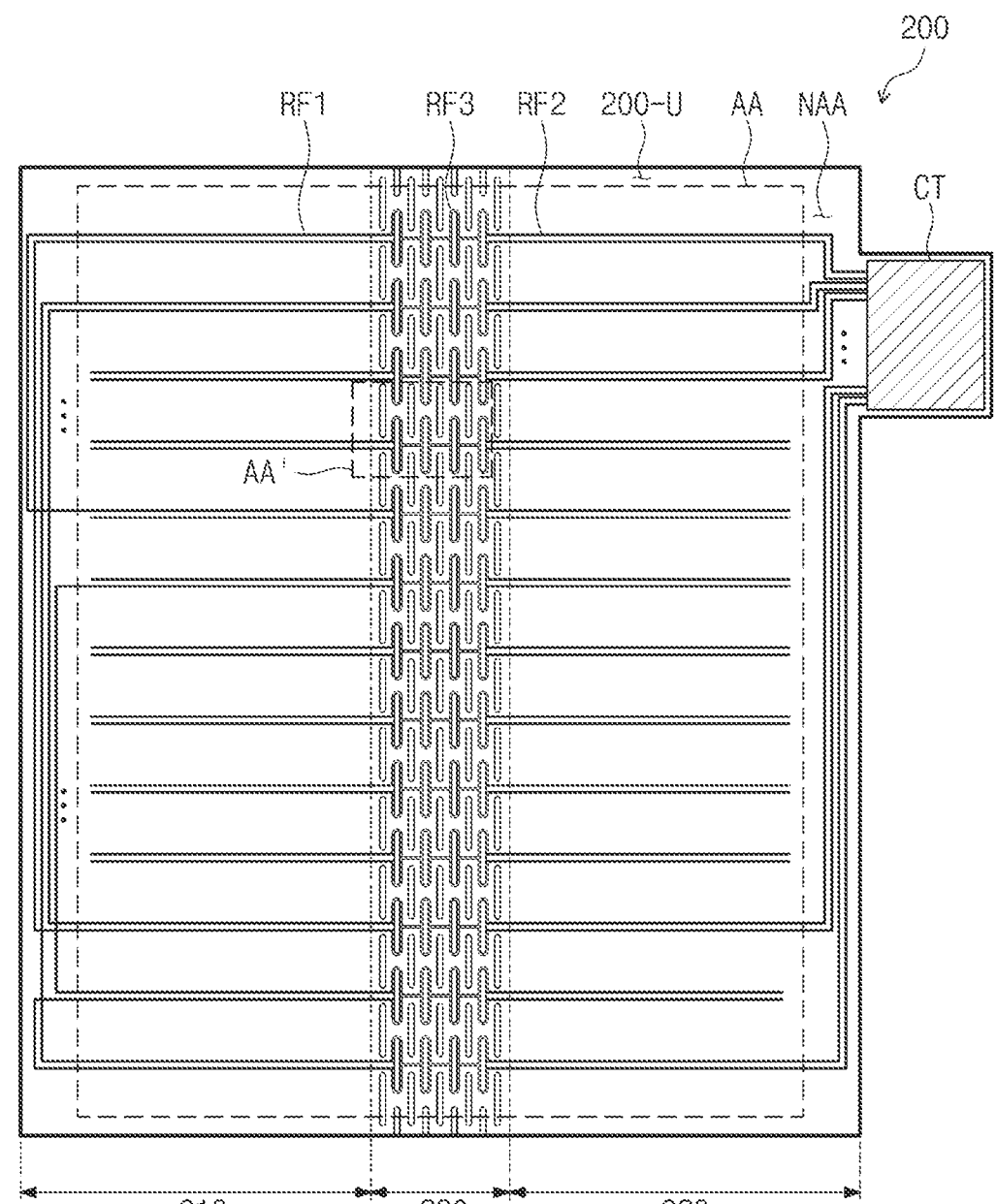
FIG. 4A is a plan view illustrating a digitizer according to an embodiment of the present invention.
Figure 5A:
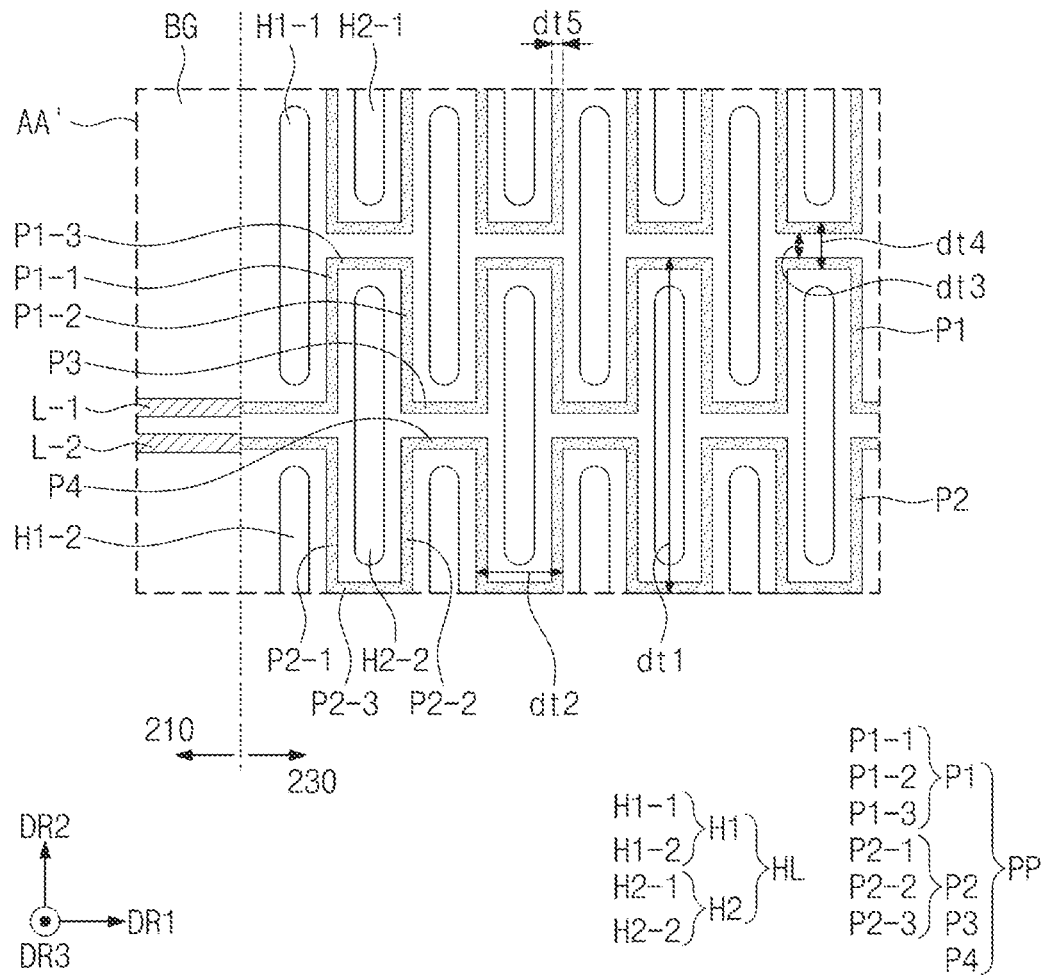
FIG. 5A is an enlarged plan view illustrating an area AA' of FIG. 4A.
Figure 5B:
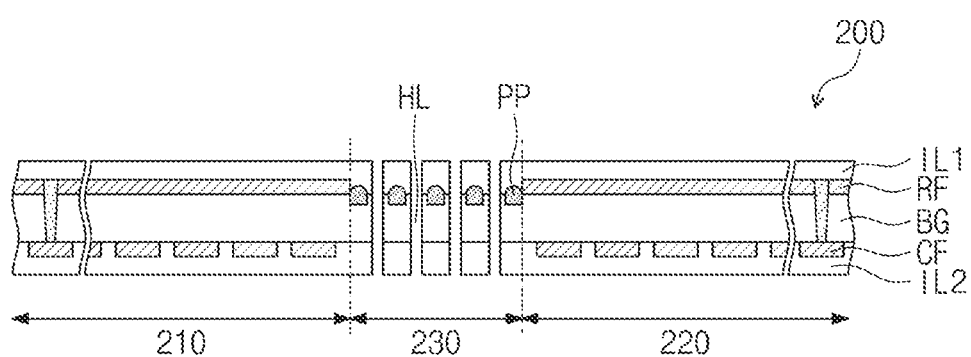
FIG. 5B is a cross-sectional view illustrating the digitizer according to an embodiment of the present invention.
Figure 6A:
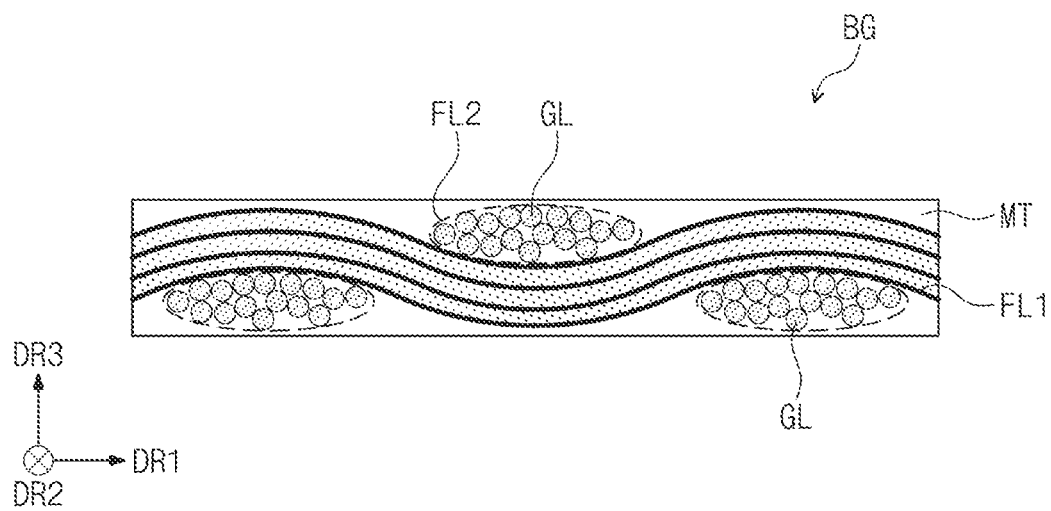
FIG. 6A is a cross-sectional view illustrating a base layer according to an embodiment of the present invention.
Figure 6B:
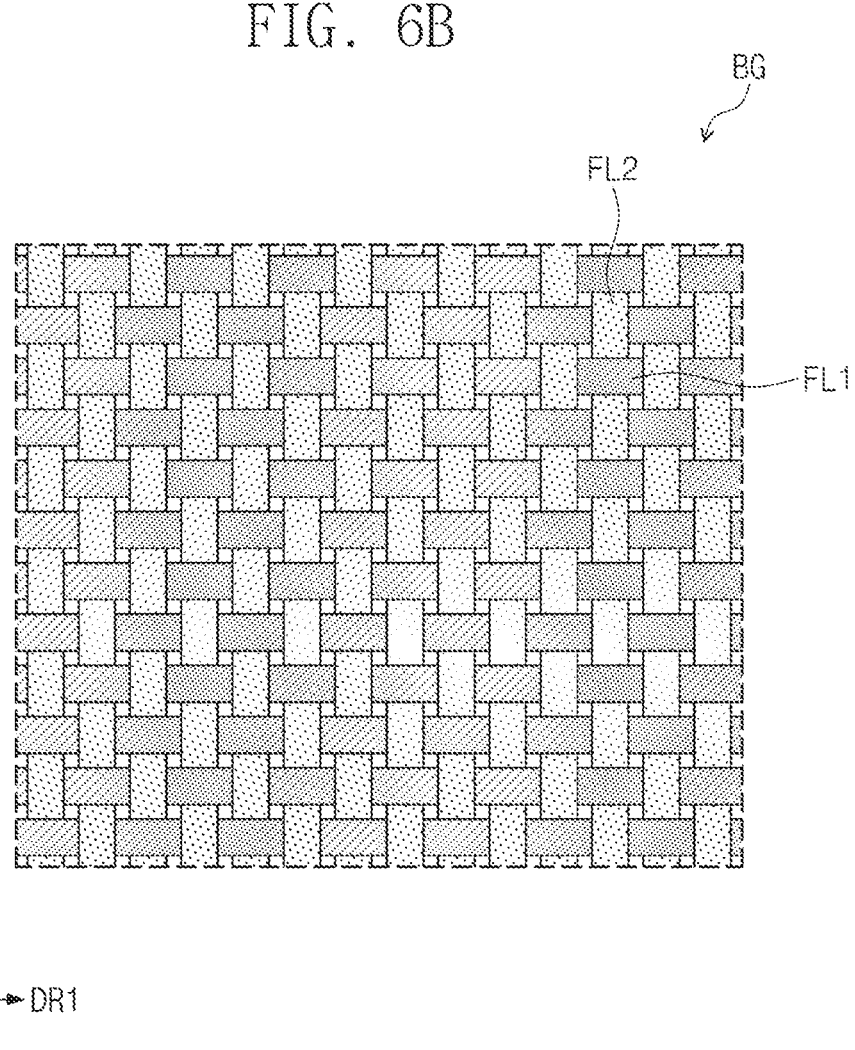
FIG. 6B is a plan view of the base layer according to an embodiment of the present invention.

FIG. 4A is a plan view of the digitizer according to an embodiment of the present invention. FIG. 1B is a rear view of the digitizer according to an embodiment of the present invention. FIG. 5A is an enlarged plan view of an area AA' of FIG. 4A. FIG. 5B is a cross-sectional view of the digitizer according to an embodiment of the present invention. FIG. 6A is a cross-sectional view of the base layer according to an embodiment of the present invention. FIG. 6B is a plan view of the base layer according to an embodiment of the present invention. As used herein, the "plan view" is a view in the third direction DR3.

Figure 4B:
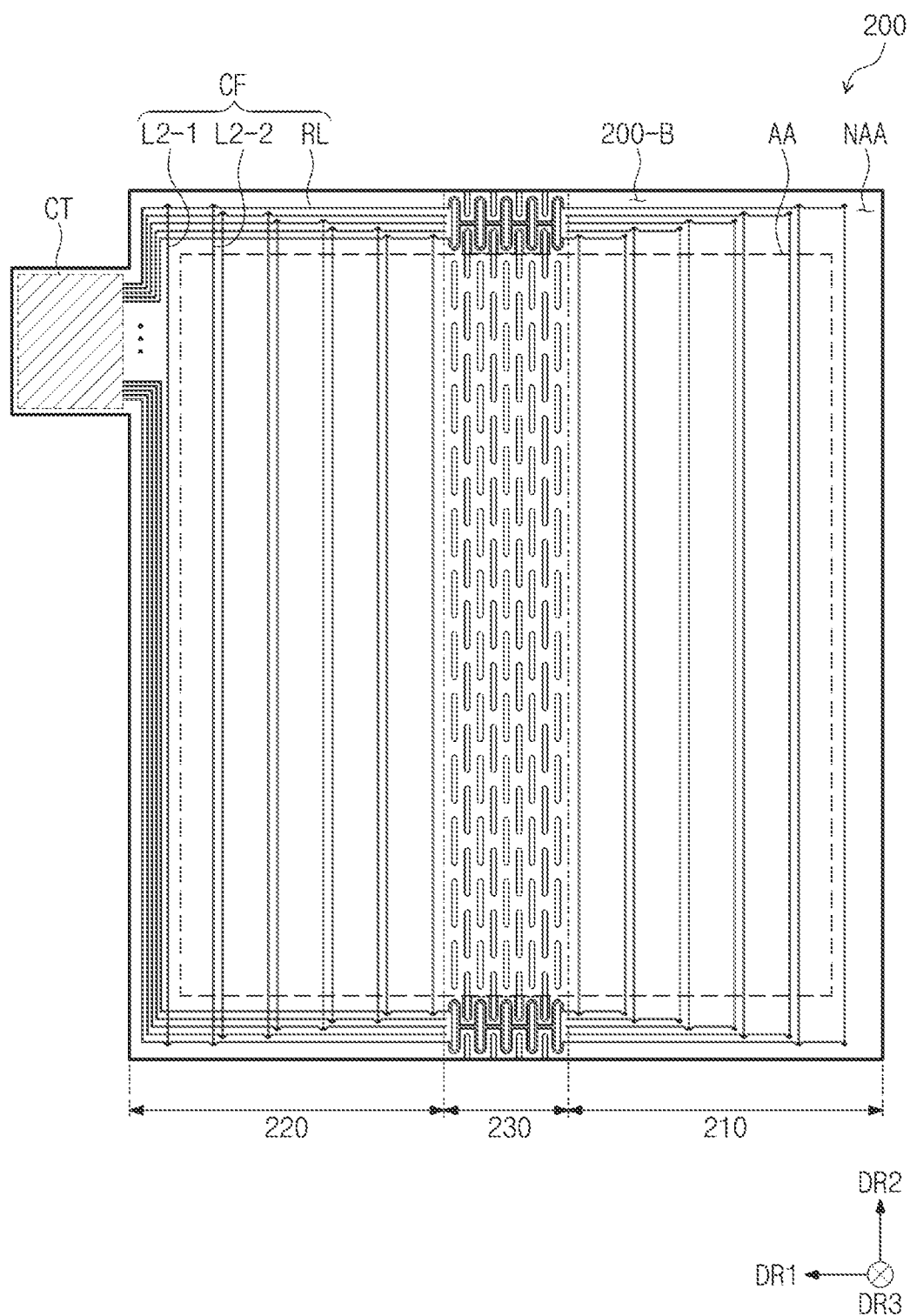
FIG. 4B is a rear view illustrating the digitizer according to an embodiment of the present invention.

FIG. 4A illustrates an example of sensing coils disposed on a front surface 200-U of the digitizer 200, and FIG. 4B illustrates an example of sensing coils disposed on a rear surface 200-B of the digitizer 200. FIG. 4A illustrates a plurality of first sensing coils RF disposed on the front surface 200-U of the digitizer 200, and FIG. 4B illustrates a plurality of second sensing coils CF disposed on the rear surface 200-B of the digitizer 200. However, the embodiment of the present invention is not limited thereto. For another example, the plurality of second sensing coils CF may be disposed on the front surface 200-U of the digitizer 200, and the plurality of first sensing coils RF may be disposed on the rear surface 200-B of the digitizer 200.

Referring to FIGS. 4A and 4B, the digitizer 200 may include an active area AA and a peripheral area NAA. The active area AA may be defined as an area sensing an input of a pen, and the peripheral area NAA may be defined as an area on which connection lines for allowing each of the sensing coils RF and CF to be a loop. The digitizer 200 may include the plurality of sensing coils RF and CF and a connector CT.

Each of the plurality of first sensing coils RF may include long sides and short sides. The long sides of the plurality of first sensing coils RF may each extend in the first direction DR1 and be spaced apart from each other in the second direction DR2. The short sides of the first sensing coils RF may be connected to ends of each of the long sides to connect the spaced long sides. Thus, each of the plurality of first sensing coils RF may provide one loop.

Although the long sides and the short sides of each of the plurality of first sensing coils RF may be disposed on the same layer, the embodiment of the present invention is not limited thereto. For another example, the long sides and the short sides may be disposed on different layers. Also, the plurality of first sensing coils RF of one loop may be spaced apart from each other, and the long sides of the coils adjacent to each other among the plurality of first sensing coils RF of one loop may be arranged alternately to each other.

In an embodiment, each of the plurality of first sensing coils RF may include a first portion RF1, a second portion RF2, and a third portion RF3. In an embodiment, the first portion RF1 and the second portion RF2 may be spaced apart from each other in the first direction DR1. The third portion RF3 may be disposed between the first portion RF1 and the second portion RF2 to connect the first portion RF1 and the second portion RF2. For example, the first portion RF1 may be disposed on the first non-folding part 210, the second portion RF2 may be disposed on the second non-folding part 220, and the third portion RF3 may be disposed on the folding part 230.

Each of the plurality of second sensing coils CF may include long sides L2-1 and L2-2 each extending in the second direction DR2 and a routing line RL extending in the first direction DR1 and connecting one ends of the long sides L2-1 and L2-2 spaced apart from each other in the first direction DR1. In an embodiment, the long sides L2-1 and L2-2 of each of the plurality of second sensing coils CF may be disposed on the first and second non-folding parts 210 and 220 and may not be disposed on the folding part 230.

One end extending to the peripheral area NAA of each of the second sensing coils CF may be connected to the connector CT.

In this embodiment, the plurality of first sensing coils RF may be referred to as sensing coils, and the plurality of second sensing coils CF may be referred to as driving coils. However, the embodiment of the present invention is not limited thereto, and vice versa. Also, the plurality of first sensing coils RF may be referred to as first coils, and the plurality of second sensing coils CF may be referred to as second coils. When current flows through the plurality of second sensing coils CF, a magnetic field may be inducted between the plurality of second sensing coils CF and the plurality of first sensing coils RF. The plurality of first sensing coils RF may sense induced electromagnetic force emitted from the electromagnetic pen and output the electromagnetic force as a sensing signal to one terminal of each of the plurality of first sensing coils RF. The one terminals of the plurality of first sensing coils RF may be connected with signal lines disposed on the peripheral area NAA.

FIG. 5A is an enlarged plan view of an area AA' of FIG. 4A. FIG. 5B is a cross-sectional view of the digitizer according to an embodiment of the present invention. In FIG. 5A, a first insulation layer IL1 is omitted when the digitizer according to an embodiment is viewed in the plan view (i.e., plan view). FIG. 5A corresponds to a plan view of a base layer.

In FIG. 5A, examples of first and second lines L-1 and L-2 are illustrated. The first and second lines L-1 and L-2 may be disposed on a base layer BG. Each of the first and second lines L-1 and L-2 may correspond to one of the plurality of first sensing coils RF described with reference to FIG. 4A. For example, portions of the first and second lines L-1 and L-2 disposed on the first and second non-folding parts 210 and 220 may correspond to the first portion RF1 and the second portion RF2. A portion of the first and second lines L-1 and L-2 disposed on the folding part 230 may correspond to the third portion RF3.

Referring to FIGS. 4A to 5B, the first and second lines L-1 and L-2 disposed on the first and second non-folding parts 210 and 220 may each extend in the first direction DR1 and be spaced apart from each other in the second direction DR2. The first and second lines L-1 and L-2 may be disposed adjacent to each other in the plan view and provide a first group line. In an embodiment, the plurality of first sensing coils RF may be obtained by repeatedly arranging the first group line of the first and second lines L-1 and L-2 arranged in the second direction DR2. A spaced distance between the first line L-1 and the second line L-2 contained in different first group lines among two first group lines disposed adjacent along the second direction DR2 may be greater than a spaced distance between the first line L-1 and the second line L-2 contained in the same first group line.

Each of the holes HL defined in the folding part 230 may have a first width in the first direction DR1, which is less than a second width thereof in the second direction DR2 in the plan view.

The plurality of holes HL may be provided in a plurality of rows. In an embodiment, the plurality of holes HL may include a first group hole H1 and a second group hole H2. For example, the first group hole H1 may include a first-first hole H1-1 and a first-second hole H1-2, which are arranged in the second direction DR2. The second group hole H2 may include a second-first hole H2-1 and a second-second hole H2-2, which are arranged in the second direction DR2. The first group hole H1 and the second group hole H2 may be spaced apart from each other in the first direction DR1.

In an embodiment, the second group hole H2 may be disposed shifted by a predetermined distance from the first group hole H1 in the second direction DR2. According to an embodiment, the shifted distance may be less than a half of the second width. Thus, the rest portion of the folding part 230 except for the holes HL may have a lattice-patterned slit shape.

Also, the plurality of holes HL may be provided in a plurality of rows. For example, a plurality of first-first holes H1-1 arranged in one row may be spaced apart from each other in the first direction DR1 and each extend in the second direction DR2. A plurality of second-first holes H2-1 arranged in one row may be spaced apart from each other in the first direction DR1 and each extend in the second direction DR2.

The plurality of holes HL may be provided by various methods. For example, the plurality of holes HL may be provided by a laser process or a micro-blast process. However, the embodiment of the present invention is not limited thereto.

In an embodiment, the base layer BG may include a plurality of engraved patterns PP defined in the folding part 230. The first and second lines L-1 and L-2 disposed on the folding part 230 may be disposed in the plurality of engraved patterns PP. Each of the engraved patterns PP may have a shape recessed in a thickness direction of the base layer BG.

According to an embodiment, the first and second lines L-1 and L-2 disposed in the plurality of engraved patterns PP may include liquid metal. The liquid metal that is a metallic material having a low melting point to maintain a liquid phase even at room temperature may be, e.g., a gallium alloy, Eutectic gallium-indium (EGain), or galinstan. The liquid metal may have excellent conductivity (about $1 \times 10^7$ Siemens per meter (S/m)) and low resistivity (volume resistivity) of $1 \times 10^{-4} \Omega$ or less to exhibit excellent line sensitivity. According to an embodiment of the present invention, as the lines disposed on the folding part 230 are made of the liquid metal, crack occurrence and disconnection of the lines may be effectively prevented even in a plurality of folding operations. Thus, the electronic apparatus 1000 according to an embodiment may effectively prevent resistance increase and driving failure at the folding part.

In an embodiment, the third portion RF3 corresponding to the first and second lines L-1 and L-2 disposed on the folding part 230 may include the liquid metal and be disposed in the plurality of engraved patterns PP. For example, the third portion RF3 may be disposed in the plurality of engraved patterns PP and include at least one of a gallium alloy, Eutectic gallium-indium (EGain), or galinstan. For example, the third portion RF3 may be the gallium alloy. The third portion RF3 may prevent a flowability of the liquid metal as a mold is filled in the plurality of engraved patterns PP.

Also, since the liquid metal has high surface tension, when the first and second lines L-1 and L-2 are disposed in the plurality of engraved patterns PP, each of the first and second lines L-1 and L-2 may have a height greater than a height of a top surface of the base layer BG. That is, when the third portion RF3 is disposed in the plurality of engraved patterns PP, a top surface of the third portion RF3 may be positioned higher than the top surface of the base layer BG in a thickness direction (i.e., the third direction DR3) of the base layer BG according to an embodiment.

Accordingly, the first and second lines L-1 and L-2 disposed on the folding part 230 may directly contact the first and second lines L-1 and L-2 disposed on the first and second non-folding parts 210 and 220. Thus, the electronic apparatus 1000 according to an embodiment may exhibit improved sensitivity by preventing resistance increase caused by oxide layer generation even when the lines made of the liquid metal are contained in the folding part 230.

In an embodiment, the plurality of engraved patterns PP may include a plurality of first patterns P1 and a plurality of second patterns P2, each of which surrounds a portion of corresponding holes HL among the plurality of holes HL. The plurality of first patterns P1 may be arranged in the first direction DR1, and two first patterns P1 adjacent to each other may be connected through a third pattern P3. The plurality of second patterns P2 may be arranged in the first direction DR1, and two second patterns P2 adjacent to each other may be connected through a fourth pattern P4. The plurality of first patterns P1 may be spaced apart from the plurality of second patterns P2 in the second direction DR2, respectively.

Each of the first patterns P1 may include a first-first pattern P1-1, a first-second pattern P1-2, and a first-third pattern P1-3. The first-first pattern P1-1 and the first-second pattern P1-2 may each extend in the second direction DR2 and be spaced apart from each other in the first direction DR1 with one of the plurality of holes HL therebetween. The first-third pattern P1-3 may connect the first-first pattern P1-1 and the first-second pattern P1-2, which are spaced apart from each other with one hole therebetween. For example, the first-first pattern P1-1 may be spaced apart from the first-second pattern P1-2 with a second-second hole H2-2 therebetween in the first direction DR1. Also, the first-third pattern P1-3 may connect the first-first pattern P1-1 and the first-second pattern P1-2, which are disposed at opposite sides of the second-second hole H2-2 in the first direction DR1.

Each of the second patterns P2 may include a second-first pattern P2-1, a second-second pattern P2-2, and a second-third pattern P2-3. The second-first pattern P2-1 and the second-second pattern P2-2 may each extend in the second direction DR2 and be spaced apart from each other in the first direction DR1 with one of the plurality of holes HL therebetween. The second-third pattern P2-3 may connect the second-first pattern P2-1 and the second-second pattern P2-2, which are spaced apart from each other with one hole therebetween. For example, the second-first pattern P2-1 may be spaced apart from the second-second pattern P2-2 with the second-second hole H2-2 therebetween in the first direction DR1. Also, the second-third pattern P2-3 may connect the second-first pattern P2-1 and the second-second pattern P2-2, which are disposed at the opposite sides of the second-second hole H2-2.

According to an embodiment, in a plan view, two engraved patterns PP among the plurality of engraved patterns PP may each extend in the first direction DR1 and be spaced apart from each other in the second direction DR2 with one of the plurality of holes HL therebetween. A first spaced distance dt1 between the two engraved patterns PP disposed at opposite sides of one hole in the second direction DR2 may be greater than about 5.5 mm and less than about 7.5 mm. For example, the first-third pattern P1-3 and the second-third pattern P2-3 may be spaced apart from each other in the second direction DR2, and the first spaced distance dt1 between the first-third pattern P1-3 and the second-third pattern P2-3 may be greater than about 5.5 mm and less than about 7.5 mm.

According to an embodiment, in a plan view, two engraved patterns PP among the plurality of engraved patterns PP may each extend in the second direction DR2 and be spaced apart from each other in the first direction DR1 with one of the plurality of holes HL therebetween. Here, a second spaced distance dt2 between the two engraved patterns PP disposed at opposite sides of one hole in the first direction DR1 may be greater than about 0.1 mm and less than about 0.6 mm. For example, the second spaced distance dt2 between the first-first pattern P1-1 and the first-second pattern P1-2, which are spaced apart from each other in the first direction DR1, may be greater than about 0.1 mm and less than about 0.6 mm.

According to an embodiment, in a plan view, the plurality of engraved patterns PP may include two engraved patterns PP each extending in the first direction DR1 and spaced apart from each other in the second direction DR2 between two holes HL adjacent to each other in the second direction DR2 among the plurality of holes HL. The two engraved patterns PP spaced apart from each other between the holes HL adjacent to each other in the second direction among the holes contained in the same group may have a third spaced distance dt3 and a fourth spaced distance dt4. In an embodiment, the third spaced distance dt3 may be a spaced distance between two engraved patterns PP except for widths of the two engraved patterns PP. In an embodiment, the fourth spaced distance dt4 may be a spaced distance between two engraved patterns PP including widths of the two engraved patterns PP.

In an embodiment, the third spaced distance dt3 may be greater than about 0.01 mm. For example, the third spaced distance dt3 may be greater than about 0.01 mm and less than about 0.18 mm. The fourth spaced distance dt4 may be less than about 0.2 mm. For example, the fourth spaced distance dt4 may be greater than about 0.02 mm and less than about 0.2 mm.

For example, the first-third pattern P1-3 and the second-third pattern P2-3 disposed between the second-first hole H2-1 and the second-second hole H2-2, which are adjacent to each other in the second direction DR2, may have the third spaced distance dt3 greater than about 0.01 mm and the fourth spaced distance dt4 less than about 0.2 mm.

In an embodiment, each of the engraved patterns PP may have a predetermined width dt5. For example, each of the engraved patterns PP may have a width dt5 of about 0.01 mm or more and about 0.09 mm or less.

Referring to FIG. 5B, the digitizer 200 according to an embodiment may include the base layer BG, the first and second sensing coils RF and CF disposed on opposite surfaces of the base layer BG, respectively, and first and second insulation layers IL1 and IL2 disposed on the opposite surfaces of the base layer BG to cover corresponding first and second sensing coils RF and CF, respectively.

The first sensing coils RF may be disposed on one surface of the base layer BG. The second sensing coils CF may be disposed on the other surface of the base layer BG, which is opposite to the one surface. Although the first sensing coils RF are disposed on a front surface of the base layer BG, and the second sensing coils CF are disposed on a rear surface of the base layer BG in FIG. 5B, this is merely illustrative, and the embodiment of the present invention is not limited thereto. For another example, the first sensing coils RF may be disposed on the rear surface of the base layer BG, and the second sensing coils CF may be disposed on the front surface of the base layer BG.

The holes HL defined in the folding part 230 of the digitizer 200 may pass through from the front surface to the rear surface of the base layer BG.

The first insulation layer IL1 may be disposed on the front surface of the digitizer 200 to cover the first sensing coils RF. First openings corresponding to the holes HL may be defined in the first insulation layer IL'.

The second insulation layer IL2 may be disposed on the rear surface of the digitizer 200 to cover the second sensing coils CF. Second openings corresponding to the holes HL may be defined in the second insulation layer IL2.

As the first openings, the holes HL, and the second openings are defined through by the same process, the first openings, the holes HL, and the second openings, which correspond to each other, may be aligned in the third direction DR3.

According to the embodiment, each of the first and second insulation layers IL1 and IL2 may have a predetermined color. For example, each of the first and second insulation layers IL1 and IL2 may have a black color. The first and second insulation layers IL1 and IL2 having the color may be provided by applying an insulating material containing a dye or a pigment. Although each of the first and second insulation layers IL1 and IL2 may include a single layer or a plurality of layers of an inorganic layer or an organic layer, the embodiment of the present invention is not limited thereto.

FIG. 6A is a cross-sectional view of the base layer according to an embodiment of the present invention. FIG. 6B is a plan view of the base layer according to an embodiment of the present invention. The same or similar components as those described in FIGS. 1A to 5B will be designated by the same or similar reference numerals, respectively, and redundant descriptions thereof will be omitted.

Referring to FIGS. 6A and 6B, the base layer BG according to an embodiment may include a matrix MT including a filler and fiber lines FL1 and FL2 having a weave shape and disposed in the matrix MT.

The fiber lines FL1 and FL2 may be alternately arranged in the first direction DR1 and the second direction DR2 to have a fabric shape in a plan view.

Each of the fiber lines FL1 and FL2 may have a bundle shape in which a plurality of glass fibers GL are gathered. One strand glass fiber GL contained in one fiber line has a diameter of about 3 μm or more to about 10 μm or less.

Each of the fiber lines FL1 and FL2 may be glass fiber-reinforced plastic ("GFRP"). The fiber lines FL1 and FL2 may be disposed in the matrix MT. The matrix MT according to an embodiment may include at least one of epoxy, polyester, polyamides, polycarbonates, polypropylene, polybutylene, and vinyl ester.

The matrix MT may include a filler. The filler may include at least one of silica, barium sulphate, sintered talc, barium titanate, titanium oxide, clay, alumina, mica, boehmite, zinc borate, and zinc titanate.

According to an embodiment, the base layer BG contained in the digitizer 200 (refer to FIG. 2) may include a fiber bundle of the glass fiber-reinforced plastic disposed in the matrix MT to protect the lower portion of the display module 100 (refer to FIG. 2).

Thus, the digitizer according to an embodiment of the present invention may simultaneously perform a function of a protection member and a function of a sensing member. Thus, a separate metal plate for protecting the display module 100 may be omitted, and a separate digitizer disposed on the folding part 230 may be omitted. Thus, costs may be saved, and the slim electronic apparatus 1000 may be provided.

FIGS. 7A to 7H are cross-sectional views illustrating an example of a method for manufacturing a digitizer according to an embodiment of the present invention. The same or similar components as those described in FIGS. 2 to 6B will be designated by the same or similar reference numerals, respectively, and redundant descriptions thereof will be omitted.

Figure 7A:
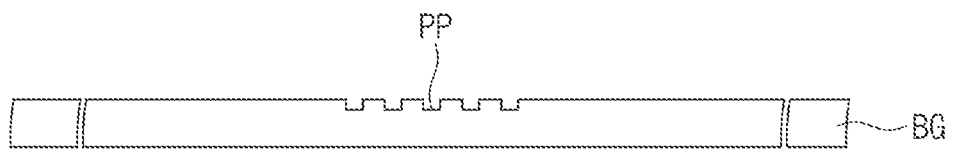
FIGS. 7A to 7H are cross-sectional views illustrating an example of a method for manufacturing a digitizer according to an embodiment of the present invention.

Referring to FIG. 7A, the method for manufacturing the digitizer according to an embodiment may form a plurality of engraved patterns PP in a front surface of a base layer BG. The plurality of engraved patterns PP may be formed in the folding part 230 (refer to FIG. 3) of the digitizer.

Figure 7B:
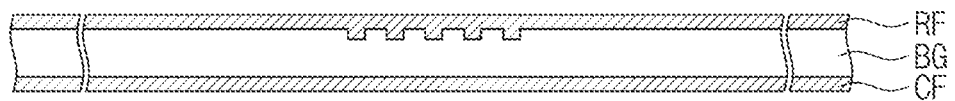

Referring to FIG. 7B, the method for manufacturing the digitizer according to an embodiment may form a first conductive layer RF on the front surface of the base layer BG and a second conductive layer CF on a rear surface of the base layer BG. Each of the first conductive layer RF and the second conductive layer CF may include copper. The first conductive layer RF and the second conductive layer CF may correspond to the first and second portions RF1 and RF2 and the second sensing coils CF described with reference to FIG. 4A, respectively.

Figure 7C:
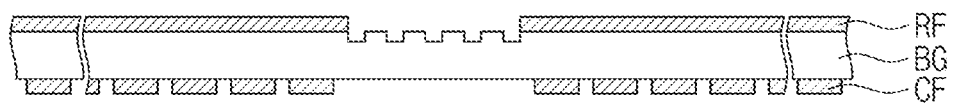

Thereafter, referring to FIG. 7C, the method may include a process of patterning the conductive layers RF and CF.

A first portion RF1 and a second portion RF2 disposed on the first and second non-folding parts 210 and 220 (refer to FIG. 4A) among first sensing coils RF may be formed by pattering the first conductive layer RF, and second sensing coils CF may be formed by patterning the second conductive layer CF. The first portion RF1, the second portion RF2, and the second sensing coils CF may have arrangement and shape corresponding to those of the first portion RF1 the second portion RF2, and the second sensing coils CF in FIGS. 4A and 4B.

Figure 7D:
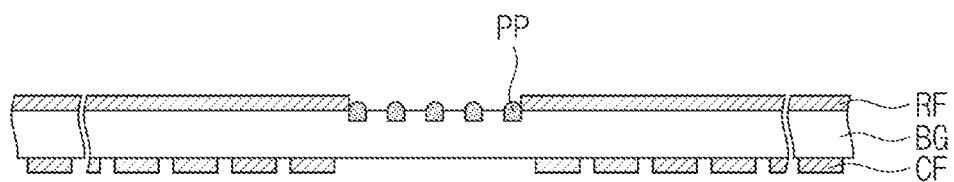

Thereafter, referring to FIG. 7D, the method may include a process of filling liquid metal into the plurality of engraved patterns PP. The liquid metal filled in the plurality of engraved patterns PP may correspond to the third portion RF3 disposed on the folding part 230 (refer to FIG. 4A). The liquid metal filled in the plurality of engraved patterns PP may have high surface tension to be filled higher than a height of a top surface of the base layer BG and directly contact the first portion RF1 and the second portion RF2.

Figure 7E:
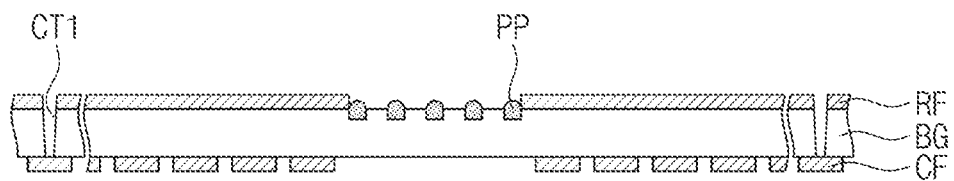

Thereafter, referring to FIG. 7E, the method may include a process of forming a contact hole CT1 in the base layer BG. The contact hole CT1 may pass through the front surface and the rear surface of the base layer BG. The contact hole CT1 may be defined in the peripheral area NAA in FIG. 4A.

Figure 7F:
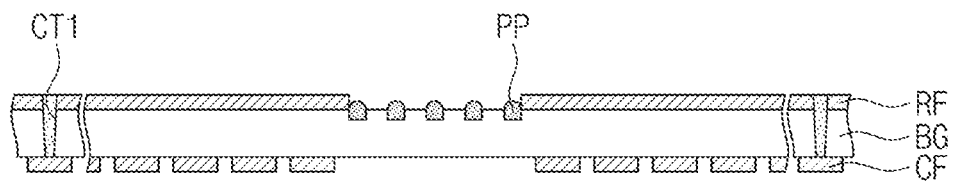

Thereafter, referring to FIG. 7F, the method may include a process of plating the contact hole CT1. As the contact hole CT1 is plated, contact hole CT1 may be filled with a metal material. Thus, some of the coils disposed on the front surface of the base layer BG among the coils disposed on the peripheral area NAA may be connected to the coils disposed on the rear surface of the base layer BG.

Figure 7G:
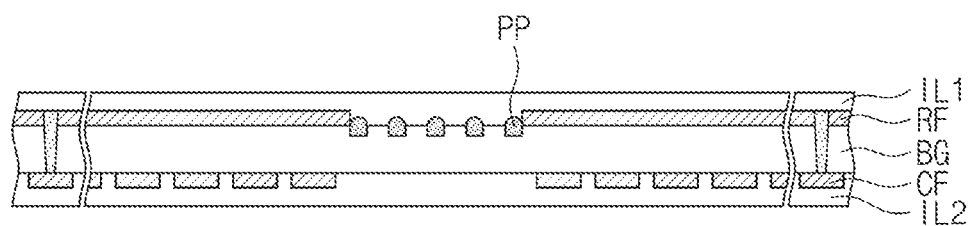

Thereafter, referring to FIG. 7G, the method may include a process of forming insulation layers IL1 and IL2 on the base layer BG. The first insulation layer IL1 may be disposed on the front surface of the base layer BG to cover the first sensing coils RF. The second insulation layer IL2 may be disposed on the rear surface of the base layer BG to cover the second sensing coils CF. Each of the insulation layers IL1 and IL2 may have a black color. The first and second insulation layers IL1 and IL2 having the black color may be formed by applying an insulating material containing a dye or a pigment.

Figure 7H:
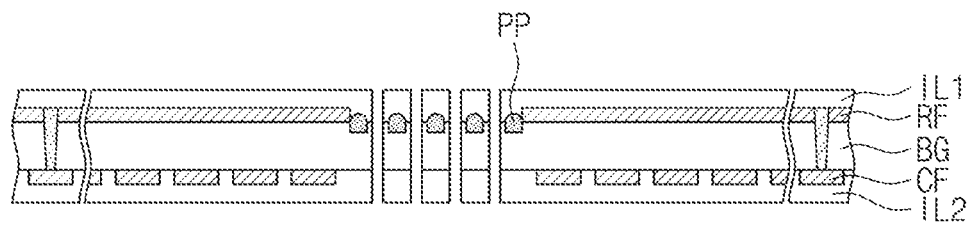

Thereafter, referring to FIG. 7H, the method may include a process of forming a plurality of holes HL passing through the base layer BG. As the first and second insulation layers IL1 and IL2 are simultaneously removed in the process of forming the plurality of holes HL, openings corresponding to the plurality of holes HL may be formed in each of the first and second insulation layers IL1 and IL2. Accordingly, the openings formed in the first and second insulation layers IL1 and IL2 corresponding to the plurality of holes HL may be aligned to each other in the third direction DR3.

The electronic apparatus according to an embodiment may prevent the resistance increase and driving failure of the sensing coils caused by the disconnection or the crack. Thus, the electronic apparatus according to an embodiment may have the improved sensitivity of the folding part.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. An electronic apparatus comprising:
    a display module having a first non-folding area and a second non-folding area, which are arranged in a first direction, and a folding area disposed between the first non-folding area and the second non-folding area and foldable with respect to a virtual folding axis extending in a second direction crossing the first direction; and
    a digitizer disposed below the display module,
    wherein the digitizer comprises:
        a base layer having a first non-folding part overlapping with the first non-folding area, a second non-folding part overlapping with the second non-folding area, and a folding part which overlaps the folding area and in which a plurality of holes are defined in a plan view;
        a plurality of first coils disposed on a first surface of the base layer and having a first portion overlapping with the first non-folding part and extending in the first direction, a second portion overlapping with the second non-folding part and extending in the first direction, and a third portion which overlaps the folding part and surrounds corresponding holes of the plurality of holes in the plan view; and
a plurality of second coils disposed on a second surface of the base layer, which is opposite to the first surface,
wherein the base layer defines a plurality of engraved patterns recessed in a thickness direction of the base layer in the folding part,
each of the engraved patterns has a single line shape, and
the third portion comprises liquid metal and is filled in the engraved patterns,
wherein for each of the plurality of holes, a length in the second direction is longer than a length in the first direction,
the plurality of holes comprises first group holes and second group holes,
the first group holes are arranged in the second direction,
the second group holes are arranged in the second direction,
the first group holes are spaced apart from the second group holes in the first direction,
a portion of the folding part between adjacent first group holes overlaps the second group holes in the first direction,
a portion of the folding part between adjacent second group holes overlaps the first group holes in the first direction, and
only one engraved pattern is defined between a first group hole and a second group hole adjacent to each other, while two engraved patterns are defined between adjacent first group holes and two engraved patterns are defined between adjacent second group holes.

2. The electronic apparatus of claim 1, wherein the liquid metal comprises at least one of a gallium alloy, Eutectic gallium-indium (EGain), or galinstan.

3. The electronic apparatus of claim 1, wherein each of the first portion and the second portion comprises copper.

4. The electronic apparatus of claim 1, wherein the plurality of engraved patterns comprises a plurality of first patterns and a plurality of second patterns,
the plurality of first pattern surrounds a portion of corresponding holes among the plurality of holes in the plan view, and
the plurality of second patterns surrounds another portion of the corresponding holes among the plurality of holes in the plan view.

5. The electronic apparatus of claim 4, wherein the plurality of engraved patterns further comprises:
a third pattern configured to connect two first patterns, of the plurality of first patterns, adjacent to each other in the first direction; and
a fourth pattern configured to connect two second patterns, of plurality of second patterns, adjacent to each other in the first direction.

6. The electronic apparatus of claim 4, wherein each of the first patterns comprises a first-first pattern and a first-second pattern, which each extend in the second direction and are spaced apart from each other in the first direction with one hole therebetween among the plurality of holes, and a first-third pattern configured to connect the first-first pattern and the first-second pattern, and
each of the second patterns comprises a second-first pattern and a second-second pattern, which each extend in a direction opposite to the second direction and are spaced apart from each other in the first direction with one hole therebetween among the plurality of holes, and a second-third pattern configured to connect the second-first pattern and the second-second pattern.

7. The electronic apparatus of claim 1, wherein in the plan view, the plurality of engraved patterns comprises two engraved patterns which each extend in the first direction and are spaced apart from each other in the second direction with one hole therebetween among the plurality of holes, and
a spaced distance between the two engraved patterns is greater than about 5.5 millimeters (mm) and less than about 7.5 mm.

8. The electronic apparatus of claim 1, wherein in the plan view, the plurality of engraved patterns comprises two engraved patterns which each extend in the second direction and are spaced apart from each other in the first direction with one hole therebetween among the plurality of holes, and
a spaced distance between the two engraved patterns is greater than about 0.1 mm and less than about 0.6 mm.

9. The electronic apparatus of claim 1, wherein in the plan view, the plurality of engraved patterns comprises two engraved patterns that each extend in the first direction and are spaced apart from each other in the second direction between holes adjacent to each other in the second direction among the plurality of holes.

10. The electronic apparatus of claim 9, wherein a spaced distance between the two engraved patterns except for widths of the two engraved patterns is greater than about 0.01 mm.

11. The electronic apparatus of claim 9, wherein a spaced distance between the two engraved patterns including widths of the two engraved patterns is less than about 0.2 mm.

12. The electronic apparatus of claim 1, wherein each of the engraved patterns has a width of equal to or greater than about 0.01 mm and equal to or less than about 0.09 mm.

13. The electronic apparatus of claim 1, wherein the base layer comprises a matrix having a filler and fiber lines disposed in the matrix and having a weave shape.

14. The electronic apparatus of claim 13, wherein the matrix comprises at least one of epoxy, polyester, polyamides, polycarbonates, polypropylene, polybutylene, and vinyl ester, and
the filler comprises at least one of silica, barium sulphate, sintered talc, barium titanate, titanium oxide, clay, alumina, mica, boehmite, zinc borate, and zinc titanate.

15. The electronic apparatus of claim 1, wherein the third portion has a top surface disposed at a higher position than the one surface of the base layer in a thickness direction thereof.

16. An electronic apparatus comprising:
a display module having a first non-folding area and a second non-folding area, which are arranged in a first direction, and a folding area disposed between the first non-folding area and the second non-folding area and foldable with respect to a virtual folding axis extending in a second direction crossing the first direction;
a panel protection layer disposed below the display module; and
a digitizer comprising a base layer comprising a folding part which overlaps the folding area and in which a plurality of holes are defined and a first non-folding part and a second non-folding part spaced apart from each other in the first direction with the folding part therebetween in a plan view, wherein the digitizer further comprises sensing coils disposed on the base layer and disposed below the panel protection layer, the base layer defines a plurality of engraved patterns recessed in a thickness direction of the base layer in the folding part, each of the engraved patterns has a single line shape, and at least a portion of the sensing coils disposed on the folding part is filled in the engraved patterns, wherein for each of the plurality of holes, a length in the second direction is longer than a length in the first direction, the plurality of holes comprises first group holes and second group holes, the first group holes are arranged in the second direction, the second group holes are arranged in the second direction, the first group holes are spaced apart from the second group holes in the first direction, a portion of the folding part between adjacent first group holes overlaps the second group holes in the first direction, a portion of the folding part between adjacent second group holes overlaps the first group holes in the first direction, and only one engraved pattern is defined between a first group hole and a second group hole adjacent to each other, while two engraved patterns are defined between adjacent first group holes and two engraved patterns are defined between adjacent second group holes.

17. The electronic apparatus of claim 16, wherein the at least a portion of the sensing coils disposed on the folding part comprise liquid metal.

18. The electronic apparatus of claim 16, wherein the engraved patterns surround corresponding holes among the plurality of holes.

19. The electronic apparatus of claim 16, wherein each of the engraved patterns has a width of equal to or greater than about 0.01 mm and equal to or less than about 0.09 mm.

* * * * *